July 6, 1943.    O. S. ZIMMERMAN ET AL    2,323,862
MEANS FOR PRODUCING FORMED STRIPS OF PLASTIC MATERIALS
Filed June 30, 1941
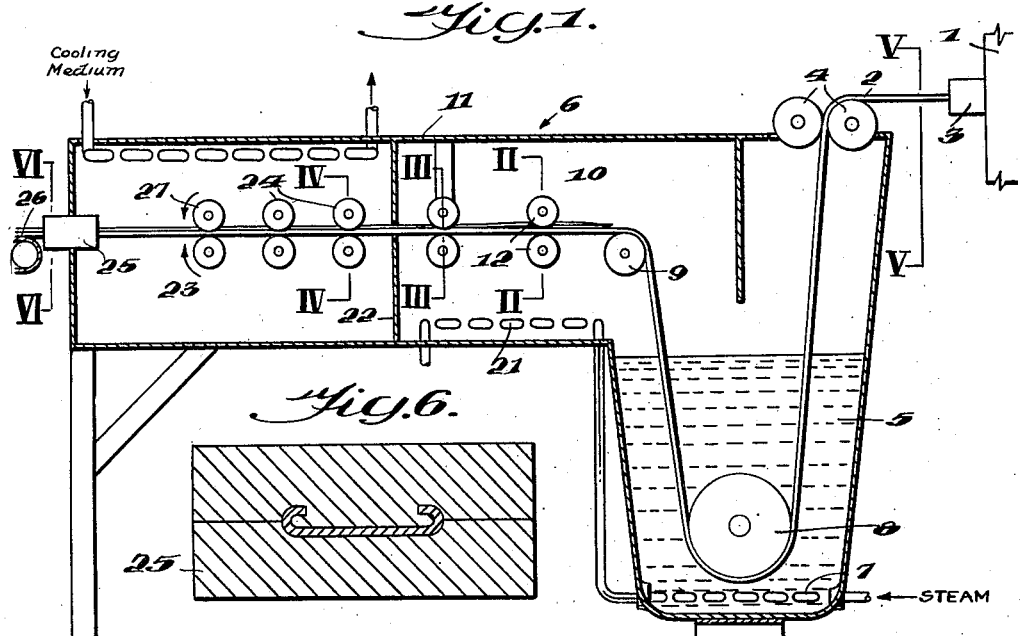
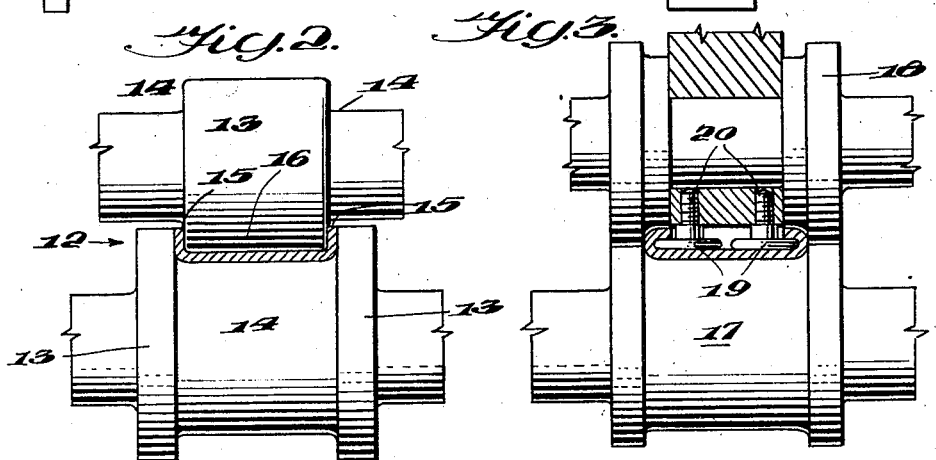
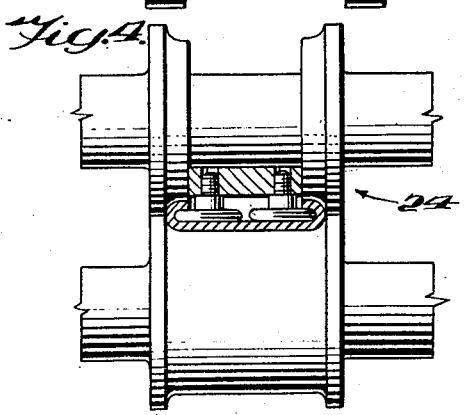
Inventor
Orr S. Zimmerman
Thomas J. Tully
By W. S. M. Howell
Attorney Patented July 6, 1943

2,323,862

UNITED STATES PATENT OFFICE 2,323,862

MEANS FOR PRODUCING FORMED STRIPS OF PLASTIC MATERIALS

Orr S. Zimmerman and Thomas J. Tully, Columbus, Ohio, assignors to Plastex Trim Corporation, Columbus, Ohio, a corporation of Ohio Application June 30, 1941, Serial No. 400,484

4 Claims. (Cl. 18—19)

This invention relates to an improved apparatus for forming strips composed of thermoplastic composition materials so that they will possess desired cross-sectional configurations.

More particularly, the present invention is concerned with the manufacture of trims, coves, edgings or moldings of the type employed in decorating, reenforcing or finishing various surfaces, to complete corners or to conceal joints formed between adjoining surfaces or bodies. Hitherto, such elements have been formed mainly by the extrusion of aluminum and alloys thereof, being comparatively costly to produce, even under normal conditions when supplies of aluminum are readily purchasable. Under present conditions, with the supply of aluminum restricted, the cost of such devices is substantially increased.

It has been found that many of the composition materials, known generally as "plastics," are particularly suitable for the production of devices of the character set forth. In fact, in certain respects, strips composed of plastics in the capacities mentioned are superior to those of metallic composition, especially from the standpoint of decreased manufacturing costs, appearance, wide latitude in the selection of colors, the ability of such strips to retain their original lustre or color after prolonged use, the ease with which said strips may be flexed when applied to curved surfaces or in conforming to corner configurations, and in other respects which need not be here detailed.

The manufacture of such strips from plastics involves certain problems peculiar to the material and differing from the practice employed in producing the metallic strips or sections. Simple extrusion of the plastic strips has not been found to be satisfactory or feasible, that is, quite frequently the strips possess intricate cross-sectional formations and, because of the inherent nature of the plastic compositions, it is difficult, if not impracticable, to merely extrude the same and obtain a physically uniform product throughout the entire length of the strip so produced. Other difficulties are also presented, such as the high cost of extrusion dies to produce different designs and the losses of material occasioned when changes are being made from a plastic of one color to that of another.

It is an object of the present invention to provide means for producing finishing strips of the character stated from plastics wherein the strips are first formed to assume a rough basic shape by either an extrusion or molding operation, the strips so formed being then heated to a stage where the same are rendered workable and deformable when subjected to pressure. When so heated, the strips are passed between a plurality of mechanical forming devices in which the desired cross-sectional design or configuration is imparted to the strips, and immediately thereafter are cooled while being passed through and held by forming devices possessing substantially the cross-sectional configuration of the strips, assuring the desired final configuration of the strips and freedom from forces which tend to distort or warp the completed strips.

In the accompanying drawing:

Fig. 1 is a view partly in side elevation and in vertical section disclosing apparatus suitable for carrying out the above recited ends of the present invention;

Fig. 2 is a vertical transverse sectional view taken through the heated forming rolls of the apparatus on the plane indicated by the line II—II of Fig. 1;

Fig. 3 is a similar view taken through the apparatus on the plane indicated by the line III—III of Fig. 1;

Fig. 4 is a vertical transverse sectional view taken through the cold rolls of the apparatus on the plane indicated by the line IV—IV of Fig. 1;

Fig. 5 is an end elevational view of the apparatus;

Fig. 6 is a transverse vertical sectional view on the line VI—VI of Fig. 1.

Referring more particularly to the details of the apparatus depicted in the drawing, the numeral I designates a diagrammatic illustration of an extrusion machine employed for extruding a plastic molding strip or its equivalent 2. While an extrusion machine is preferably employed because of its continuous operation, the strip 2 may be produced by other methods, such as by the employment of molds. The die 3 of the extrusion machine has its apertures so shaped as to impart to the strip 2 issuing therefrom a rough basic shape, such as that disclosed in Fig. 5, and in subsequent operations hereinafter described, the strip is shaped to its desired cross-sectional form.

Usually the strip 2 is quite flexible in a longitudinal direction, and this enables the same to be trained over guide rolls 4 and passed downwardly into the heating well 5 of the forming machine, indicated generally at 6. This well may contain a body of oil, heated by means of a steam coil 7, although at this juncture it will be understood that other means may be used for heating the strip as it enters the forming machine, such as by passing heated air thereover, or by contacting the same with electrically or otherwise heated surfaces. The purpose of heating the strip is to bring it to a temperature sufficiently high so that the same will be rendered deformable when engaged by pressure forming devices. The express step of heating may be dispensed with in the event the strips possess the desired temperature at the time they are discharged from the die of the extrusion machine.

In passing through the well 5, the strip is guided around a roll 8, located in the bottom of the well, and may then be passed upwardly over a guide sheave 9 located adjacent to the heated forming compartment 10, the latter being provided in the casing 11, constituting a part of the machine 6. Within the compartment 10, there is mounted for rotation about horizontal axes a pair of primary forming rolls 12. These rolls vary in configuration, in accordance with the cross-sectional shape to be produced in the strip. For instance, the same may be formed with a plurality of circular ribs 13 and intervening annular grooves 14, producing in the strip upstanding ribs 15 and an intervening groove 16.

If it is desired to bend the ribs 15, so that the same will possess a curved cross-sectional configuration, as shown in Fig. 3, a second set of forming rolls is arranged in the heated compartment 10. This second set of rolls consists of a lower roll 17 arranged for rotation about a horizontal axis, and a pair of spaced upper rolls 18, also mounted for rotation about horizontal axes. Forming wheels 19 are adapted to be received within the groove 16 and are carried by the lower ends of vertically positioned shafts 20, the peripheries of the forming wheels 19 being so shaped as to be complemental to the shapes of the adjacent portions of the rolls 18, so that as the strip is passed therebetween, the ribs 15 will be curved, to assume the configuration disclosed in Fig. 3.

It will be understood that many different shapes of rolls may be used to produce the necessary variations in the cross-sectional configuration of the strip, the rolls illustrated having been selected merely for disclosure purposes. If desired, the compartment 10 may be provided with coils 21, permitting of the circulation therethrough of a heating medium so that the deformable temperatures of the strip may be maintained. Also, if desired, each of the forming rolls may be heated by making the same hollow, and circulating a heating medium therethrough. Any suitable means, not shown, may be employed for effecting positive rotation of the rolls and the consequent advancement of the strip therethrough.

The casing 11 is provided with a transverse wall 22, which separates the heated forming compartment 10 from a cooling compartment 23. From the heated forming compartment 10, the strips are passed directly into the cooling compartment 23, and are there engaged by pressure devices which hold the cross-sectional configuration of the strip while it is being quickly cooled, preventing undesired distortion or warping of the strip and assuring its desired physical integrity. The pressure devices in the cooling compartment may consist of a series of rolls of the type indicated at 24. These rolls are mounted for rotation about horizontal axes and possess a configuration conforming to that imparted to the strip upon its discharge from the heated forming rolls, except that compensation is made for shrinkage of the strip during its rapid cooling. Upon leaving the rolls 24, the strip passes through a chill block shown at 25, and which is located at the discharge end of the compartment 23, the chill block being composed of upper and lower sections having their meeting faces formed with registering grooves corresponding to the cross-sectional shape of the strip. Upon discharge from the block 25, the strips may be received on a conveyor belt 26, which leads to a cutting mechanism, not shown, by which the strips are transversely cut into suitable lengths.

The cold rolls snugly confine the strip during its passage therebetween, exerting compression forces on the strip in order to increase its strength and density.

In view of the foregoing, it will be seen that the present invention provides means of a novel character for quickly, economically and accurately producing molding strips of plastic composition. Most of the so-called plastics may be used such as the phenol formaldehyde resins, cellulose, casein, soya bean resins and the like. The exact temperatures employed in heating the strips to the formable temperatures will vary with the composition of materials comprising the strip itself. However, the optimum temperatures may be readily determined by slight experimentation and are not particularly critical. The strips produced in accordance with the present invention are characterized by their structural uniformity throughout their entire lengths.

If desired, burnishing or polishing rolls 27 may be used to clean and brighten the appearance of the strips. It will be understood that the forming and compression rolls need not be positively driven, as the strips may be drawn between these rolls by any suitable external source of power.

What is claimed is:

1. Apparatus for producing formed strips of thermoplastic composition materials, comprising a housing structure having spaced internal forming and cooling compartments, a well provided in said forming compartment for the reception of a liquid, means for heating the atmosphere of said forming compartment and the liquid contained in said well, guide devices provided in said forming compartment for controlling the advancement of the flat plastic strip through said heated liquid and forming compartment to raise the temperature of said strip sufficiently to render the same deformable under pressure, spaced sets of shaping rolls mounted in said forming compartment and through which said strip is progressively advanced when in a deformable state, said rolls being shaped to impart to the strip a desired cross sectional configuration, complemental spaced sets of rotatable compression-applying rolls arranged in said cooling compartment and through which said strip is progressively advanced upon its discharge from said forming compartment, and heat exchanging means for maintaining the temperature of said cooling compartment substantially below that of the deformable temperature of said strip.

2. Apparatus for producing formed strips of thermoplastic composition materials, comprising a housing structure having spaced internal forming and cooling compartments, a well provided in said forming compartment for the reception of a liquid, means for heating the atmosphere of said forming compartment and the liquid contained in said well, guide devices provided in said forming compartment for controlling the advancement of the flat plastic strip through said heated liquid and forming compartment to raise the temperature of said strip sufficiently to render the same deformable under pressure, spaced sets of shaping rolls mounted in said forming compartment and through which said strip is progressively advanced when in a deformable state, said rolls being shaped to impart to the strip a desired cross sectional configuration, complemental spaced sets of rotatable compression-applying rolls arranged in said cooling compartment and through which said strip is progressively advanced upon its discharge from said forming compartment, heat exchanging means for maintaining the temperature of said cooling compartment substantially below that of the deformable temperature of said strip, and a grooved chill block disposed adjacent to the outlet of said cooling compartment and through which said strip is advanced upon its release from said compression-applying rolls.

3. Apparatus for producing formed strips of thermoplastic composition materials comprising a housing structure having spaced internal forming and cooling compartments, means for advancing a strip of said material progressively through said forming and cooling compartments, means for raising the temperature of said strip sufficiently to render the same deformable during its passage through the forming compartment, spaced sets of shaping rolls revolubly mounted in said forming compartment and through which said strip is advanced when heated to a deformable temperature, said rolls being shaped to impart to the strip a desired cross sectional configuration, spaced complemental sets of rotatable compression-applying rolls arranged in said cooling compartment and between which said strip is advanced upon its discharge from said forming compartment, and heat exchanging means for maintaining the temperature of said cooling compartment substantially below that of the deformable temperature of said strip.

4. Apparatus for producing formed strips of thermoplastic composition materials comprising a housing structure having spaced internal forming and cooling compartments, means for advancing a strip of said material progressively through said forming and cooling compartments, means for raising the temperature of said strip sufficiently to render the same deformable during its passage through the forming compartment, spaced sets of shaping rolls revolubly mounted in said forming compartment and through which said strip is advanced when heated to a deformable temperature, said rolls being shaped to impart to the strip a desired cross sectional configuration, spaced complemental sets of rotatable compression-applying rolls arranged in said cooling compartment and between which said strip is advanced upon its discharge from said forming compartment, heat exchanging means for maintaining the temperature of said cooling compartment substantially below that of the deformable temperature of said strip, and a grooved chill block disposed contiguous to the strip outlet of said cooling compartment and through which block said strip is advanced upon release from said compression-applying rolls.

ORR S. ZIMMERMAN.
THOMAS J. TULLY.